(No Model.)
G. HIRSCHMAN.
ALE FAUCET PROTECTOR.
No. 308,560. Patented Nov. 25, 1884.
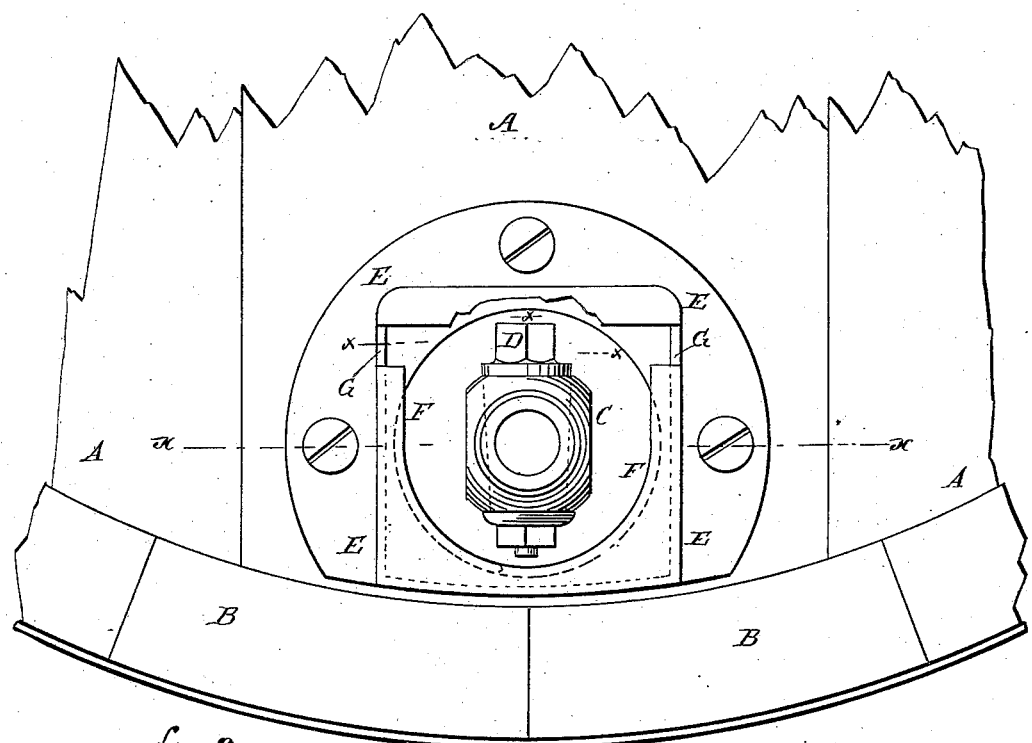
Fig: 1.
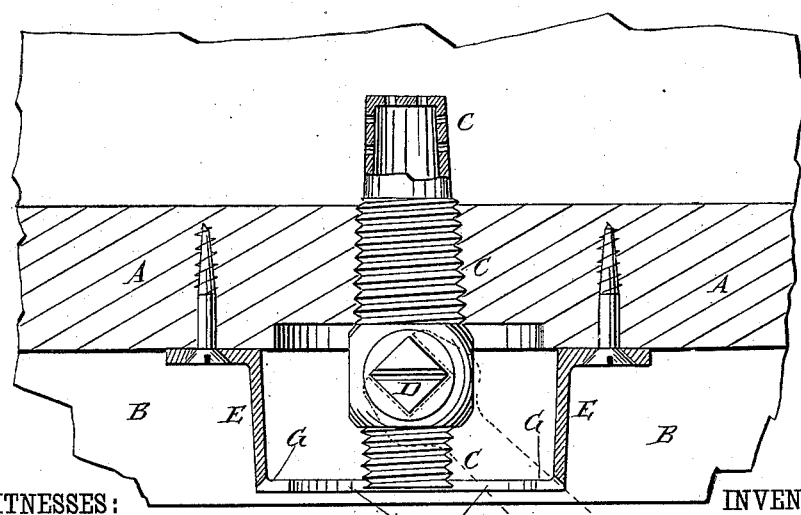
Fig: 2.
WITNESSES:
INVENTOR:
G. Hirschman
BY Munn & Co
ATTORNEYS.

UNITED STATES PATENT OFFICE.

GEORGE HIRSCHMAN, OF MORRISTOWN, ASSIGNOR OF ONE-HALF TO ADAM GEYER AND PHILIPP GEYER, OF RAHWAY, NEW JERSEY.

ALE-FAUCET PROTECTOR.

SPECIFICATION forming part of Letters Patent No. 308,560, dated November 25, 1884.

Application filed March 28, 1884. (No model.)

*To all whom it may concern:*

Be it known that I, GEORGE HIRSCHMAN, of Morristown, in the county of Morris and State of New Jersey, have invented a new and useful Improvement in Ale-Faucet Protectors, of which the following is a full, clear, and exact description.

Reference is to be had to the accompanying drawings, forming a part of this specification, in which similar letters of reference indicate corresponding parts in both the figures.

Figure 1 is a front elevation of my improvement, shown as applied to the head of an ale-cask. Fig. 2 is a sectional plan view of the same taken through the line *x x x x x*, Fig. 1.

The object of this invention is to provide a means for protecting ale-faucets when permanently attached to casks.

The invention consists in an ale-faucet protector constructed with a flanged base, and with an opening and recess in its front, whereby the said protector can be readily secured in place, will allow the faucet to be readily applied, detached, and operated, and will fully protect the said faucet, as will be hereinafter fully described, and pointed out in the claims.

A represents the head, and B the chines, of an ordinary ale-cask.

C is a faucet, which is screwed into a hole in the head A, and has its inwardly-projecting end perforated with numerous small holes to allow the ale to enter it freely. Upon the outer end of the faucet C is formed a screw-thread to receive the ordinary coupling for connecting a flexible tube with the said faucet. The plug D of the faucet C is turned to open and close the said faucet by means of an ordinary wrench, as indicated in dotted lines in Fig. 2.

To the head A, around the faucet C, is secured the flanged inner edge or base of the cap E, the body of which is made of about the shape and size of the stamp required to be placed upon the cask to which the protector has been applied.

In the front of the protector E is formed an opening, F, of such a size as to allow the faucet C to be inserted and removed through it, when required. At the upper part of the protector are formed recesses G, to allow the wrench to have the amount of movement requisite for turning the plug D to open and close the faucet C. The opening F and recesses G are covered by the revenue-stamp, when applied, so that the faucet C cannot be opened without canceling the said stamp. The protector should be a little lower than the chines B, so that the said protector will not be liable to be knocked off in handling the cask, and the end of the faucet C should be a little lower than the protector E, so that its said outer end cannot come into accidental contact with anything. In case the outer end of the faucet C be longer than the height of the protector E, the head A can be counter-sunk, as shown in Fig. 2, to allow the said faucet to be screwed so far into the said head that its outer end will be below the level of the said protector.

I am aware that faucet-protectors consisting of tubular casings adapted to be secured in a barrel and provided with apertured inner ends and caps for closing the outer ends are old, and I therefore do not claim such invention.

Having thus described my invention, I claim as new and desire to secure by Letters Patent—

1. The ale-faucet protector, consisting of the cap E, composed of an annular flange secured to the head of the case, having an annular wall at right angles thereto projecting beyond said head, and a permanent opening in the front of such protector for the insertion of the faucet, substantially as described.

2. The combination, with the cask-head A and the faucet C, of the protector E, having a flanged base, and an opening, F, and recesses G in its front, substantially as herein shown and described, whereby the faucet can be readily applied, detached, and operated, and will be securely protected, as set forth.

GEORGE HIRSCHMAN.

Witnesses:
JAMES T. GRAHAM,
C. SEDGWICK.